J. Hotchkiss,
Brick Machine.
No. 2,121. Reissued Dec. 5, 1865.
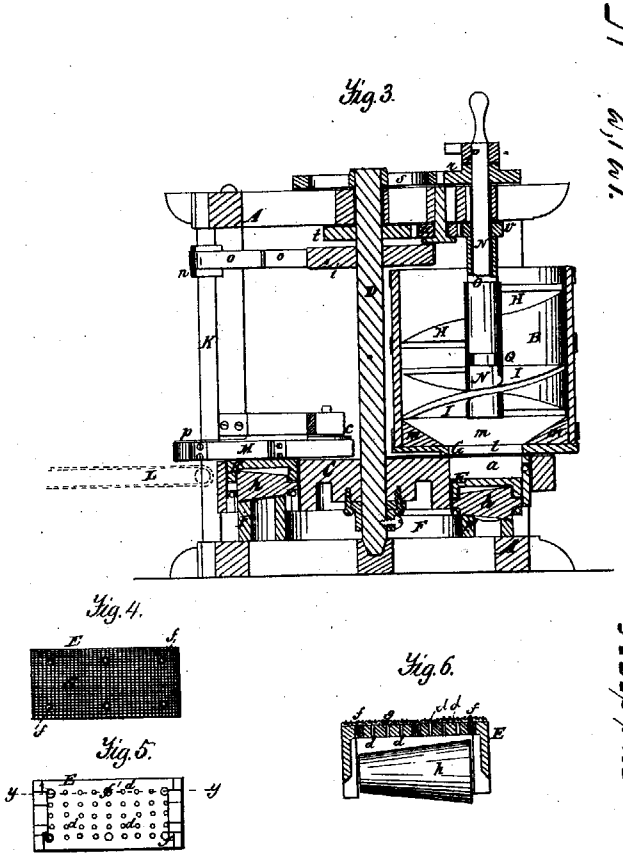
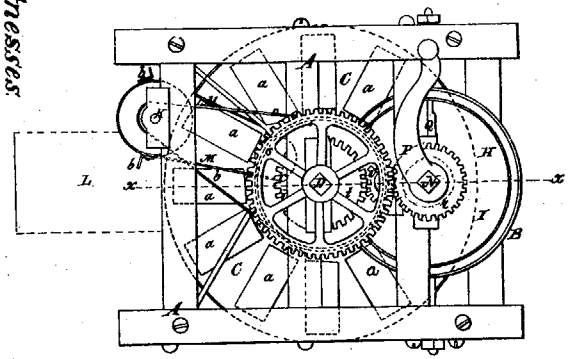
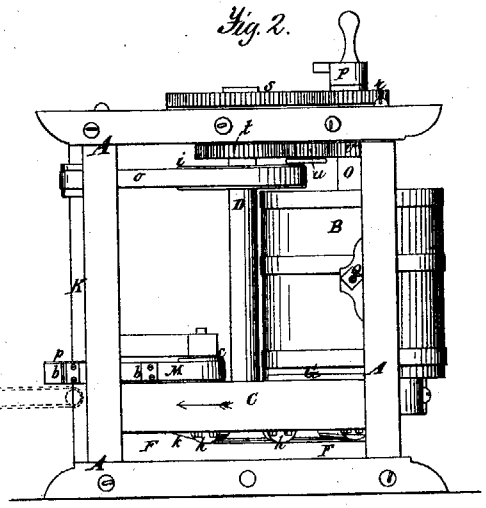
Witnesses:
R. F. Osgood.
E. N. Smith
Inventor:
Jas. Hotchkiss
By his Attorney
J. S. Brown
AM. PHOTO-LITHO. CO. N.Y. (OSBORNE'S PROCESS)

UNITED STATES PATENT OFFICE.

JAMES HOTCHKISS, OF SPRINGFIELD, OHIO.

IMPROVED BRICK-MACHINE.

Specification forming part of Letters Patent No. 29,171, dated July 17, 1860; Reissue No. 2,121, dated December 5, 1865.

*To all whom it may concern:*

Be it known that I, JAMES HOTCHKISS, of Springfield in the county of Clark and State of Ohio, have invented a new and Improved Brick and Tile Machine; and I do hereby declare that the following is a full and exact description thereof, reference being had to the accompanying drawings, making part of this specification.

Figure 1 being a plan of the machine; Fig. 2, a side elevation thereof; Fig. 3, a vertical section thereof in the plane indicated by the line *x x*, Fig. 1; Fig. 4, a plan of one of the mold followers or plungers detached; Fig. 5, a bottom view of the same; Fig. 6, a section of the same in the plane indicated by the line *y y*, Fig. 5.

Like letters designate corresponding parts in all of the figures.

The parts are all mounted in a suitable frame, A. Centrally in this frame, near the bottom, is a horizontal mold-wheel, C, one edge of which revolves beneath a feeding hopper or receptacle, B, so that the concentric molds *a a* are brought successively beneath the center of said feeding-hopper.

The power for driving the whole machine is applied, as at the winch P′, to a vertical shaft, N, in the center of the cylindrical feeding-hopper B, its lower end being supported in a cross bearing or step, Q. The motion is transferred to the shaft D of the mold-wheel by cog-wheels *r s*, or their equivalents.

The clay, having been prepared and placed in the feeding-hopper B, is forced down into the molds uniformly and with strong pressure by the following improved arrangement: On the shaft N, near the bottom of the feeding-hopper, are secured two spiral wings, I I, or a single spiral wing, covering, nearly or quite, the whole circular space of the hopper. There is sufficient space between the edges of the wing or wings for the downward transmission of the clay. The direction of the motion of the wing or wings is such that the wedge action thereof shall strongly force the clay downward. The number of wings, whether one, two, or more, is not essential, provided that the whole circle of the hopper-receptacle is nearly or wholly covered, so as to produce the downward pressure required upon the clay. The action of this wing or wings not only transmits the clay and produces the requisite downward pressure, but makes the feeding and pressure more regular.

In addition to the main pressure wing or wings I I, I contemplate the use in the hopper, when desirable, of another spiral wing H, preferably having a motion in the opposite direction to that of the lower wing or wings, I I, but having the direction of its spiral inclination such as also to force the clay downward. This auxiliary wing need not cover the entire circle of the hopper, about one-half thereof when necessary at all, generally sufficing for the purpose. If this upper wing, H, moves in the direction opposite to that of the wings I I, it is secured to a hollow shaft, O, turning around the main shaft N, and deriving its motion therefrom through gear-wheels *t u v*.

Below the spiral wings I I there are, in the bottom of the receptacle, inclined planes *m m*, which terminate in an aperture, *l*, through the strike-plate G, of the proper size and shape for filling the molds *a a* in the mold-wheel beneath, and thus direct the clay with even and constant pressure into said molds. The mold-wheel C has its molds *a a* arranged concentrically near its periphery, and is of a proper size to admit a convenient number of said molds. It turns in the direction indicated by the arrow in Fig. 2. The depth or thickness of its rim wherein the molds are formed is sufficient not only for the depth of the molds themselves, but to contain the movable bottoms, followers, or plungers E E, as seen most clearly in Fig. 3. The followers are respectively provided with supporting friction-rollers *h h*, which rest and turn upon circular concentric tracks F F. The rollers *h h* are somewhat conical, as shown, the larger end being outward and the degree of conicalness being just sufficient to make the outer end travel so much faster than the inner end as to keep the axes of the rollers in continual radial positions without sliding on the tracks. The outer track is just enough lower than the inner track to keep the followers E E level.

The tracks beneath the feeding hopper or receptacle B are of the proper height to lower the followers E E in the molds *a a* just sufficient to give the desired thickness to the bricks or tiles, as shown at the right-hand side in Fig. 3. Then as the mold-wheel moves round, and after the tops of the bricks or tiles are smoothed by the strike G, the tracks F F rise by inclined planes, as shown at *k*, Fig. 2, to such an extent as to lift the upper surfaces of the followers E E up just even with the upper surface of the mold-wheel, whereby the bricks are raised entirely out of their molds. A little farther round, just over the mold-wheel, there is located an endless belt, M, in a position substantially as shown in Fig. 1, or so that its outward motion will be nearly radial across the path of the motion of the molds *a a*. The belt turns round two pulleys, *p* and *c*, and the proper motion is communicated to it generally by a band passing from a pulley, *i*, on the shaft D to a pulley, *n*, on the shaft K of the pulley *p*. From the outer surf ce of the endless belt M project plates or hands *b b*, nearly at right angles thereto, and at such distance apart in relation to the motion of the belt and of the mold-wheel as to cause each one in succession to strike, respectively, each brick in succession and shove it outward off of the mold-wheel upon an endless apron, L, shown in red lines, or an equivalent device for carrying the bricks away.

The followers E E are pierced with fine vent-holes *d d*, as seen in Figs. 5 and 6, and over the upper surface of each follower is laid a piece of cloth, *g*, Figs. 4 and 6, such as canton-flannel, covering the whole follower. This cloth may be secured on the follower if of metal by nails *f f* driven into wooden plugs in apertures of the follower provided for the purpose. The principal object of this cloth and the perforations below is to allow the free escape of the air in filling the molds, so that not only are the molds more readily filled, but smoother and better bricks are formed. The bricks are also more easily separated from the followers thereby.

What I claim as my invention, and desire to secure by Letters Patent, is—

1. A revolving spiral wing or wings covering all or nearly all of the interior of the receptacle, substantially as herein set forth, in combination with a revolving mold-wheel, for the purposes specified.

2. In combination with a spiral wing or wings, covering nearly or all the space of the receptacle, an additional spiral wing or wings in the receptacle, either revolving in the same direction or attached to an encircling shaft and revolving in the opposite direction, for the purpose herein set forth.

3. The combination of the perforated followers with the covering of cloth upon the same, substantially as and for the purposes herein specified.

The above specification signed by me this 24th day of August, 1865.

JAMES HOTCHKISS.

Witnesses:
T. B. BROWN,
E. R. GARD.